US008169904B1

(12) United States Patent  
Breau et al.

(10) Patent No.: US 8,169,904 B1
(45) Date of Patent: May 1, 2012

(54) FEEDBACK FOR DOWNLINK SENSITIVITY

(75) Inventors: Jeremy R. Breau, Leawood, KS (US); Shingara Singh Dhanoa, Overland Park, KS (US); George A. Georgiou, Olathe, KS (US); Reza Jafari, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 256 days.

(21) Appl. No.: 12/393,273

(22) Filed: Feb. 26, 2009

(51) Int. Cl.
*G01R 31/08* (2006.01)
(52) U.S. Cl. ........................................ 370/231
(58) Field of Classification Search ........... 370/230.1, 370/231–236, 248, 249, 252, 253, 319, 338, 370/389, 468, 477
See application file for complete search history.

(56) References Cited

U.S. PATENT DOCUMENTS

| | | | | |
|---|---|---|---|---|
| 5,767,850 A * | 6/1998 | Ramanathan et al. | ........ | 715/797 |
| 6,018,341 A * | 1/2000 | Berry et al. | ........... | 715/794 |
| 6,222,856 B1 * | 4/2001 | Krishnan et al. | ........... | 370/468 |
| 6,560,243 B1 * | 5/2003 | Mogul | ........... | 370/468 |
| 6,594,234 B1 * | 7/2003 | Chard et al. | ........... | 370/236 |
| 6,657,964 B1 * | 12/2003 | Kohzuki et al. | ........... | 370/236.1 |
| 6,842,783 B1 * | 1/2005 | Boivie et al. | ........... | 709/225 |
| 6,920,110 B2 * | 7/2005 | Roberts et al. | ........... | 370/235 |
| 6,996,626 B1 * | 2/2006 | Smith | ........... | 709/232 |
| 7,020,084 B1 * | 3/2006 | Tanaka et al. | ........... | 370/235 |
| 7,206,285 B2 * | 4/2007 | Loguinov | ........... | 370/235 |
| 7,290,064 B2 * | 10/2007 | Patel et al. | ........... | 709/250 |
| 7,317,727 B2 * | 1/2008 | Droz et al. | ........... | 370/395.4 |
| 7,403,476 B2 * | 7/2008 | Krishnan | ........... | 370/229 |
| 7,417,992 B2 * | 8/2008 | Krishnan | ........... | 370/395.41 |
| 7,426,181 B1 * | 9/2008 | Feroz et al. | ........... | 370/232 |
| 7,426,185 B1 * | 9/2008 | Musacchio et al. | ........ | 370/235.1 |
| 7,439,975 B2 * | 10/2008 | Hsu | ........... | 345/426 |
| 7,664,034 B1 * | 2/2010 | Eatough et al. | ........... | 370/235 |
| 7,668,968 B1 * | 2/2010 | Smith | ........... | 709/234 |
| 7,680,038 B1 * | 3/2010 | Gourlay | ........... | 370/230 |
| 7,747,965 B2 * | 6/2010 | Holecek et al. | ........... | 715/781 |
| 7,760,643 B2 * | 7/2010 | Kim et al. | ........... | 370/235 |
| 7,796,246 B2 * | 9/2010 | Choi | ........... | 356/125 |
| 7,802,195 B2 * | 9/2010 | Saul et al. | ........... | 715/769 |
| 2003/0236827 A1 * | 12/2003 | Patel et al. | ........... | 709/203 |
| 2004/0078460 A1 * | 4/2004 | Valavi et al. | ........... | 709/224 |
| 2004/0120252 A1 * | 6/2004 | Bowen et al. | ........... | 370/229 |
| 2004/0255254 A1 * | 12/2004 | Weingart et al. | ........... | 715/804 |
| 2005/0270283 A1 * | 12/2005 | Plut | ........... | 345/211 |
| 2006/0041846 A1 * | 2/2006 | Masselle et al. | ........... | 715/793 |
| 2006/0041864 A1 * | 2/2006 | Holloway et al. | ........... | 717/124 |
| 2006/0085764 A1 * | 4/2006 | Klementiev | ........... | 715/853 |
| 2006/0277491 A1 * | 12/2006 | Kaneko | ........... | 715/788 |

(Continued)

OTHER PUBLICATIONS

J. Ott, Helsinki University of Technology, C. Perkins, University of Glasgow; Guidelines for Extending the RTP Control Protocol (RTCP); Jul. 7, 2008; www.ietf.org/internet-drafts/draft-ietf-avt-rtcp-guidelines-00.txt.

(Continued)

*Primary Examiner* — Kwang B Yao
*Assistant Examiner* — Jung-Jen Liu

(57) ABSTRACT

A method, system, and medium are provided for managing bandwidth associated with a communication session characterized by a plurality of data packets being transmitted from a sender to a receiver. The receiver can include functions that monitor communication sessions and determine bandwidth adjustments corresponding thereto for optimizing the user's experience. The receiver can communicate feedback messages to senders that include requests for bandwidth adjustments. According to embodiments, senders can include well-known feedback listening ports through which feedback messages are received, enabling out-of-band user experience optimization.

19 Claims, 7 Drawing Sheets

U.S. PATENT DOCUMENTS

2010/0205310 A1* 8/2010 Altshuler et al. ............. 709/228
2010/0220745 A1* 9/2010 Lauwers et al. ............. 370/468

OTHER PUBLICATIONS

Hung-Yun Hsieh, Kyu-Han Kim, Yujie Zhu, and Raghupathy Sivakumar; A Receiver-Centric Transport Protocol for Mobile Hosts With Hetrogeneous Wireless Intefaces; MobiCom '03, Sep. 14-19, 2003, San Diego, CA.

David Anderson, Deepak Bansal, Dorothy Curtis, Srivivasan Seshan, Hari Balakrishnan; System Support for Bandwidth Management and Content Adaptation in Internet Applications; Dec. 16, 2008; www.cs.cmu.edu/~dga/papers/cm-osdi2000/.

* cited by examiner

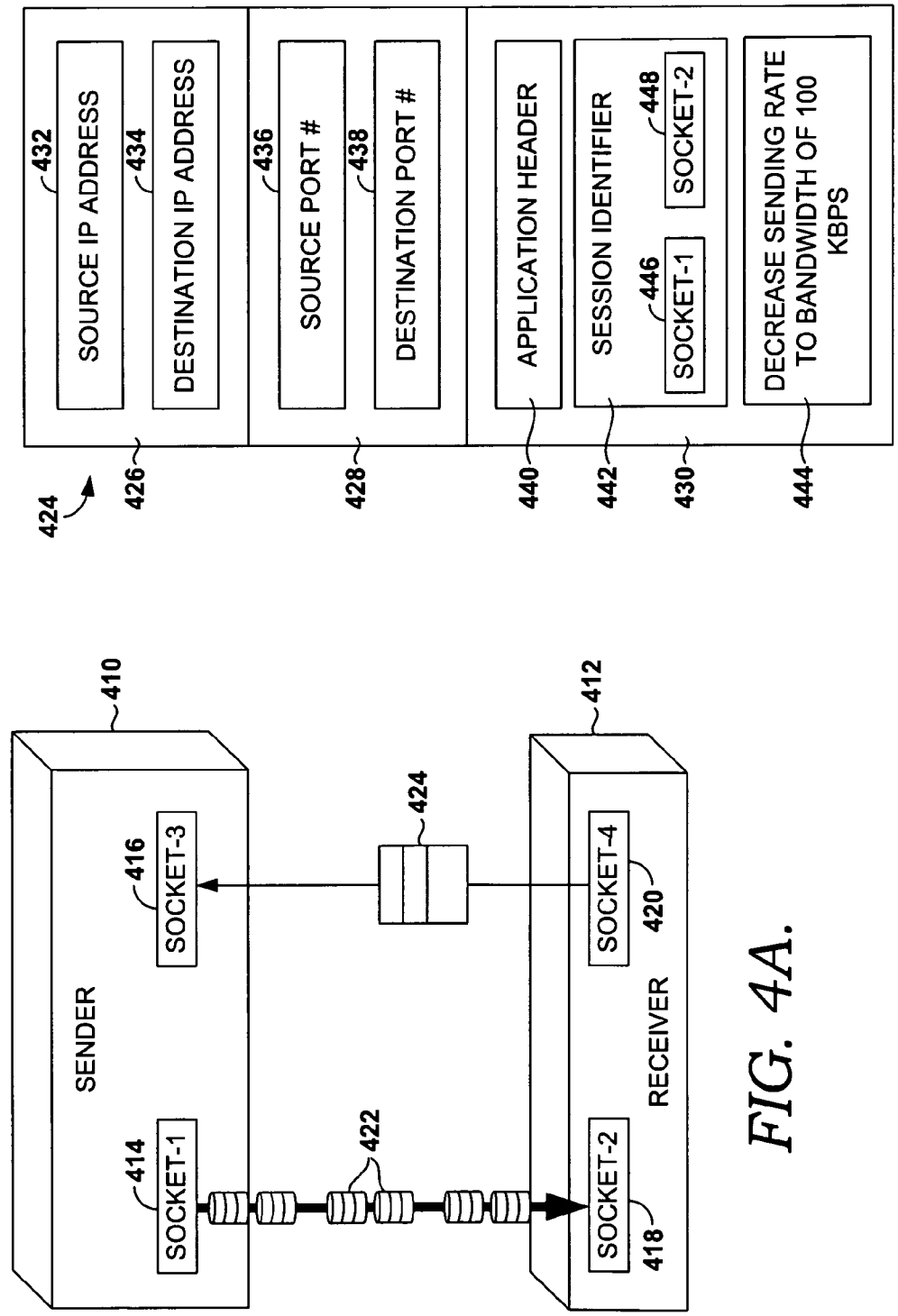

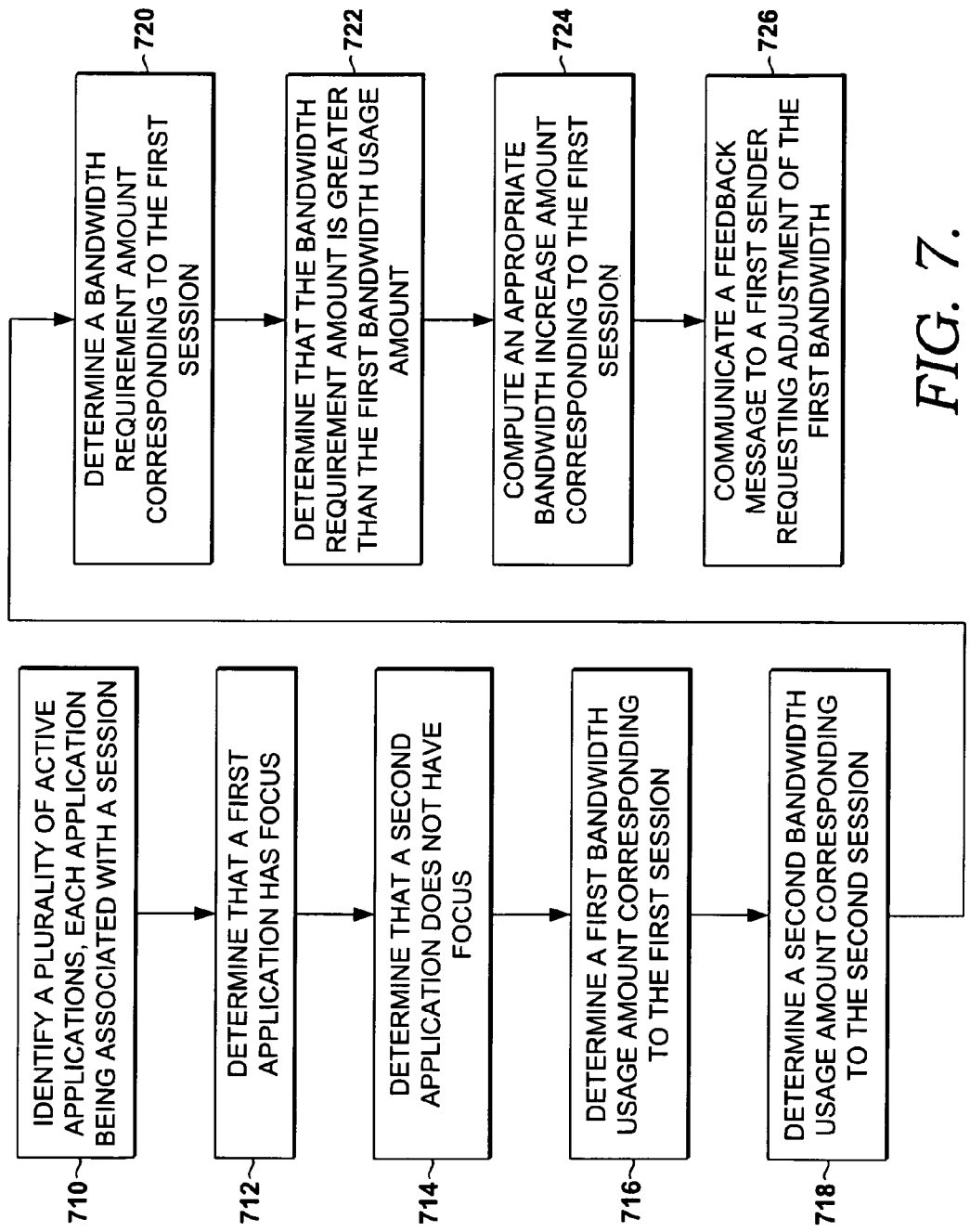

FEEDBACK FOR DOWNLINK SENSITIVITY

SUMMARY

Embodiments of the invention are defined by the claims below, not this summary. An overview of embodiments of the invention is provided here for that reason.

In a first embodiment, a set of computer-executable instructions provides an illustrative method of managing bandwidth corresponding to one or more communication sessions associated with a receiver on a computing device. Embodiments of the illustrative method include referencing a plurality of active applications that correspond to communication sessions and determining that a first application has focus. Bandwidth requirement amounts and bandwidth usage amounts corresponding to a first communication session can be determined and compared. In an embodiment of the illustrative method, feedback is communicated to a sender associated with the first communication session. The feedback can include, for example, a request to adjust the bandwidth associated with the first communication session.

In a second embodiment, a set of computer-executable instructions provides an illustrative method of managing a plurality of communication sessions associated with a receiver. According to embodiments of the illustrative method, a user-experience manager on the receiver can identify a plurality of active applications, where each application is associated with a communication session. Embodiments of the illustrative method further include determining that a first application has focus and a second application does not have focus. Bandwidth usage and requirement amounts corresponding to the first and second sessions can be determined and an optimizing decision can be made regarding whether to adjust one of the bandwidths. In embodiments of the illustrative method, the receiver communicates feedback to one or more senders to request adjustments of bandwidth in accordance with the optimizing decision.

According to a third embodiment, a system for use in a data packet sender is provided, which facilitates managing a bandwidth associated with sending data packets to a receiver during a communication session. Embodiments of the illustrative system include a media out port through which the sender transmits data packets, a feedback listening port through which the sender receives feedback messages from the receiver, and a bandwidth manager that adjusts data packet transmission rates, packet sizes, or the like according to the feedback.

BRIEF DESCRIPTION OF THE SEVERAL VIEWS OF THE DRAWINGS

Illustrative embodiments of the invention are described in detail below with reference to the attached drawing figures, which are incorporated by reference herein and wherein:

FIG. 4A is a schematic diagram showing an illustrative implementation of an embodiment of the invention;

FIG. 4B is a block diagram depicting an illustrative feedback message in accordance with embodiments of the invention;

FIG. 7 is another flow diagram showing an illustrative method of managing a plurality of communication sessions associated with a receiver in accordance with embodiments of the invention.

DETAILED DESCRIPTION

Throughout the description of embodiments of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the invention.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks are performed by remote-processing devices that are linked through a communications network. Computer-readable media include both volatile and nonvolatile media, removable and nonremovable media, and contemplates media readable by a database, a switch, and various other network devices, which are non-transitory in nature. By way of example, and not limitation, computer-readable media comprise media implemented in any method or technology for storing information. Examples of stored information include computer-useable instructions, data structures, program modules, and other data representations. Media examples include, but are not limited to, information-delivery media, random access memory (RAM), read-only memory (ROM), electrically erasable programmable read-only memory (EEPROM), flash memory or other memory technology, compact disc read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
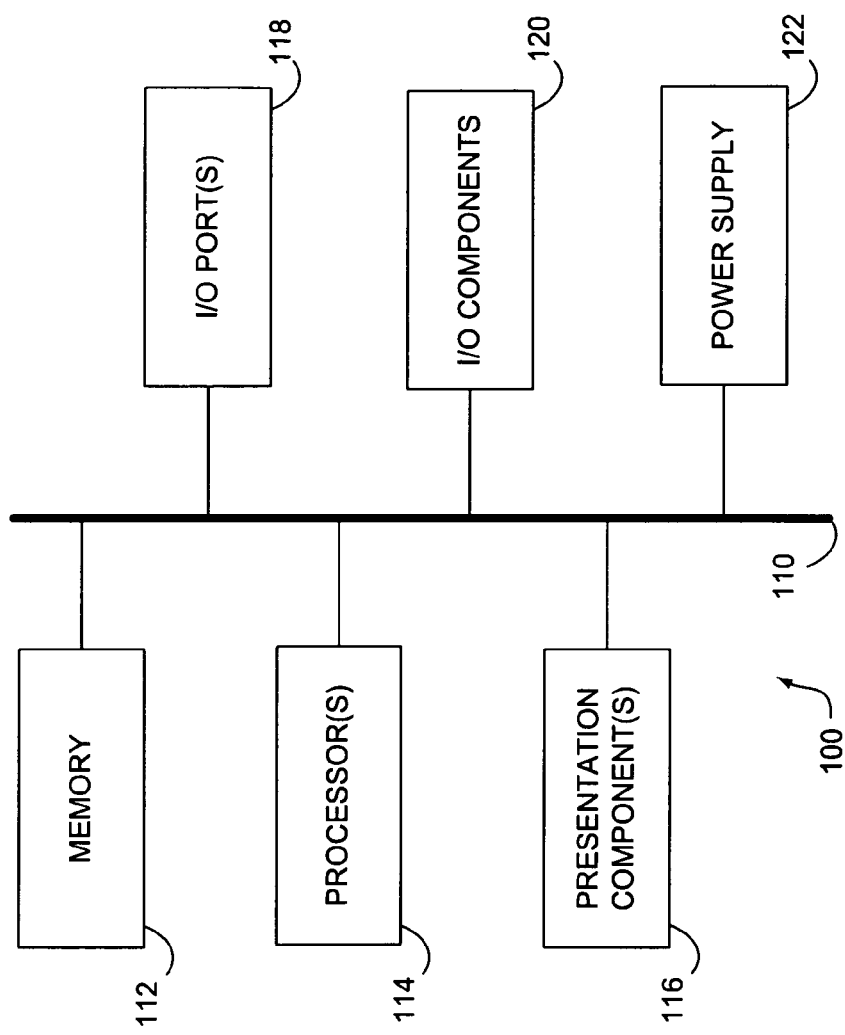
FIG. 1 is a block diagram showing an exemplary computing device in accordance with embodiments of the invention.

An exemplary operating environment in which various embodiments of the invention may be implemented is described below in order to provide a general context. Referring initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention.

Neither should the computing device 100 be interpreted as having any dependency or requirement relating to any one or combination of components illustrated.

Computing device 100 includes a bus 110 that directly or indirectly couples the following devices: memory 112, one or more processors 114, one or more presentation components 116, input/output (I/O) ports 118, input/output (I/O) components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computing device."

Memory 112 includes computer-storage media in the form of volatile and/or nonvolatile memory. The memory 112 may be removable, nonremovable, or a combination thereof. Exemplary memory devices include solid-state memory, hard drives, optical-disc drives, etc. Computing device 100 includes one or more processors 114 that read data from various entities such as memory 112 or I/O components 120. Presentation component(s) 116 present data indications to a user or other device. Exemplary presentation components include a display device, speaker, printing component, etc.

I/O ports 118 allow computing device 100 to be logically coupled to other devices including I/O components 120, some of which may be built in. Illustrative I/O components include a microphone, joystick, game pad, satellite dish, scanner, printer, wireless device, keyboard, pen, voice-input device, touch-input device, touch-screen device, interactive display device, or a mouse.

Figure 2:
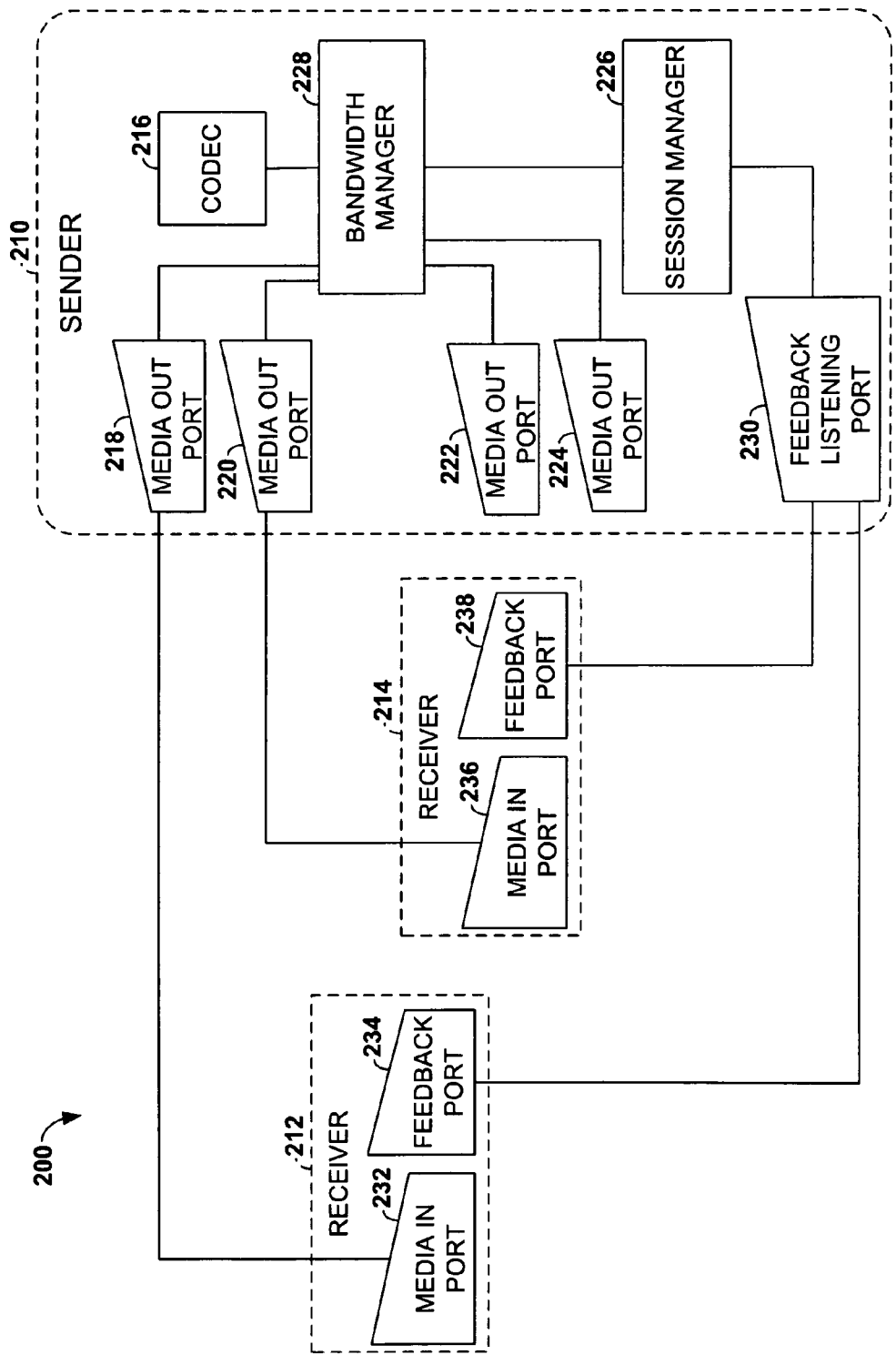
FIG. 2 is a block diagram showing an exemplary network environment suitable for implementing embodiments of the invention.

Turning to FIG. 2, an exemplary network environment 200 for implementing embodiments of the invention is shown. Network environment 200 includes a sender 210 and receivers 212 and 214. Sender 210 is an entity, network component, software module, hardware device, or the like that sends data packets to receivers 212 and 214. Although not illustrated in FIG. 2, it will be understood that sender 210 can communicate with receivers 212 and 214 through one or more networks. The networks can be any kind of suitable network such as, for example, a local area network (LAN), a wide area network (WAN), the Internet, or a combination of networks. Network environment 200 is merely an example of one suitable network environment and is not intended to suggest any limitation as to the scope of use or functionality of embodiments of the invention. Neither should network environment 200 be interpreted as having any dependency or requirement related to any single component or combination of components illustrated therein.

Sender 210 can be any kind of device, server, or software module that is capable of sending data packets to receivers 212 and 214. For example, in an embodiment, sender 210 is a streaming server, often referred to simply as a "streamer," that provides data services to receivers 212 and 214. For instance, in some embodiments, sender 210 can be a server that provides media services such as multimedia, video, audio, or the like. In some embodiments, sender 210 is hosted by a single machine such as, for example, a computing device 100. In other embodiments, sender 210 can be distributed across a number of machines.

In an embodiment, sender 210 transmits data packets to receivers 212 and 214 according to a standard transport-layer protocol such as, for example, user datagram protocol (UDP). In other embodiments, sender 210 can communicate with receivers 212 and 214 using other types of connectionless protocols.

With continued reference to FIG. 2, receivers 212 and 214 can be any suitable entity that receives data packets from sender 210. For example, in an embodiment, receivers 212 and 214 are clients or software modules hosted by a user's computing device. In other embodiments, each receiver 212 and 214 is a computing device such as, for example, computing device 100, discussed above with reference to FIG. 1. That is, receivers 212 and 214 can be located on any number of types of devices such as, for example, a personal computer, a laptop computer, a wireless telephone, a personal digital assistant (PDA), a cellular phone, and the like. Additionally, neither sender 210 nor receivers 212 and 214 should be interpreted as having any dependency or requirement related to any single component or combination of components illustrated therein.

As depicted in FIG. 2, sender 210 includes codec 216, media out ports 218, 220, 222, and 224, session manager 226, bandwidth manager 228, and feedback listening port 230. Using any number of various types of codec 216, sender 210 encodes and transmits, via media out ports 218, 220, 222, and 224 streams of data packets to receivers 212 and 214. In some embodiments, sender 210 may transmit data packets to only one receiver 212 or 214, while in other embodiments, sender 210 transmits data packets to a number of receivers 212, 214. In some embodiments, sender 210 transmits the same or similar data packets to each of receivers 212 and 214 and in other embodiments, sender 210 can transmit unique data packets to each of receivers 212 and 214. Any combination of the above and other configurations are considered to be within the ambit of embodiments of the invention.

Codec 216 can include encoders, decoders, encoder/decoders, and the like and can be adapted for generating various data according to any number of various standards such as, for example, standards developed by the Moving Picture Experts Group (MPEG), Joint Photographic Experts Group (JPEG), formats such as Windows Media Video (WMV), and the like. In some embodiments, as illustrated in FIG. 2, sender 210 can include a set of codecs 216 for each media out port 218, 220, 222, and 224. In other embodiments, sender 210 can include one set of codecs 216 that service all of the media out ports 218, 220, 222, and 224. In further embodiments, any number of layers of codecs, filters, and other functions and components can be used by sender 210 during communication sessions (e.g., UDP sessions) with receivers 212 and 214. Additionally, it should be understood that media out ports 218, 220, 222, and 224 can, in some embodiments, be integrated within a single port. In other embodiments, sender 210 can include a variety of media out ports 218, 220, 222, and 224. Also, media out ports 218, 220, 222, and 224 are not limited to physical port connections, but can also include logical ports such as, for example, identifiers that correspond to particular functions or types of media, logically addressable data communication destinations, and the like.

Session manager 226 can include servers, software modules, firmware, and other components and modules that perform various functions associated with codec 216 and media out ports 218, 220, 222, and 224. According to various embodiments of the invention, session manager 226 organizes and manages communication sessions in which sender 210 transmits data packets to, for example, receivers 212 and 214. For instance, in some embodiments, session manager 226 interfaces with codec 216 and media out ports 218, 220, 222, and 224 to coordinate the encoding and transmitting of streams of data packets to receivers 212 and 214. The data packets can embody various types of media such as data files, email service, video, multimedia, audio conferencing, streaming radio stations, and the like. Session manager 226 can facilitate the retrieval of content for transmission to receivers 212 and 214. In embodiments, sender 210 can include storage modules, databases, and the like for maintaining content to provide to receivers 212 and 214. In other embodiments, sender 210 can retrieve content from other sources such as, for example, content servers, other networks, other devices, application servers, and the like.

According to embodiments of the invention, session manager 226 maintains information associated with communication sessions in which sender 210 transmits data packets to a receiver 212, 214. In some embodiments, session manager 226 hosts a database, table, file, or other data storage component that contains various types of data. For example, in embodiments, session manager 226 can record information corresponding to a communication session. Such information can include addressing information, identification information, information about bandwidth usage amounts related to various communication sessions, and the like. In one embodiment, for example, sender 210 is a UDP streamer and session manager 226 maintains socket identifiers corresponding to each of the UDP sessions in which sender 210 is involved. Socket identifiers can include addressing information such as, for example, internet protocol (IP) addresses, port numbers, packet transmission rates, information about packet size, and the like.

In embodiments of the invention, session manager 226 identifies communication sessions according to identification information, addressing information, and the like. For example, in one embodiment, session manager 226 uses a socket identification (e.g., an IP address corresponding to the sender 210 and a port number corresponding to the media out port being used in the session) to identify a communication session. In other embodiments, session manager 226 can use other identifiers as well. According to some embodiments, session manager 226 identifies communication sessions using tuples. A tuple is a discrete set of data that includes addressing information associated with the parties involved in a communication session. In embodiments, a tuple can include a socket identification corresponding to sender 210 and a socket identification corresponding to receiver 212 or 214. That is, for example, a tuple might include an IP address and port number associated with sender 210 and an IP address and port number associated with receiver 212 or 214. In various embodiments of the invention, session manager 226 can differentiate between communication sessions using tuples because a different media out port 218, 220, 222, 224 is used for each session. In other embodiments, sender 210 may use the same media out port 218, 220, 222, or 224 for all sessions, but differentiates between sessions, because the socket identification (e.g., IP address and port number) associated with each receiver 212 and 214 will be different.

With reference to FIG. 2, session manager 226 can receive feedback information by way of feedback listening port 230. Feedback information is communicated to sender 210 by receivers 212 and 214 in the form of feedback messages. The structure of feedback messages is described in more detail below, with reference to FIG. 4B. In various embodiments of the invention, feedback messages include data packets that contain an instruction to increase or decrease a packet transmission rate, bandwidth, or packet size associated with a particular communication session. In embodiments, the communication session is identified according to its corresponding tuple. Additionally, feedback messages can include an identifier associated with the active application on the receiver 212 or 214 that is consuming the data packet stream. In this manner, receiver 212 or 214 can send feedback messages to sender 210 that include an identification of the tuple corresponding to the session with which the feedback message is associated so that the sender 210 can determine which data packet stream to adjust.

According to various embodiments of the invention, session manager 226 receives feedback messages communicated from receiver 212 or 214 via feedback listening port 230, parses the messages, and performs operations in response to the messages. For instance, in embodiments, a feedback message can include a request to decrease or increase a bandwidth associated with a communication session. Session manager 226 can cooperate with bandwidth manager 228 to adjust the bandwidth of the session accordingly. Bandwidth manager 228 can include independent logic for managing bandwidth associated with a number of communication sessions. In other embodiments, bandwidth manager 228 includes modules for adjusting the bandwidth based on logic processed by session manager 226. Bandwidth manager 228 can adjust bandwidth in any number of ways. For example, in one embodiment, bandwidth manager 228 can intercept and eliminate a certain number of data packets from a stream of data packets being passed from codec 216 to one of the media out ports 218, 220, 222, or 224, thereby reducing the number of data packets being sent during any given period of time. In other words, bandwidth manager 228 can adjust the rate of data packet transmission. In some embodiments, bandwidth manager 228 can increase the number of data packets being sent during any period of time by retrieving more data packets from codec 216, by copying selected data packets, and the like.

In further embodiments, bandwidth manager 228 can adjust the speed at which data packets are sent or the size of data packets. For example, in some embodiments, bandwidth manager 228 can independently, or upon instructions from session manager 226, select a codec 216 for use in a communication session among a number of available codecs 216. In this manner, sender 210 can change the data format and/or data packet size to satisfy bandwidth adjustment requests. In other embodiments, bandwidth manager 228 can include codecs, filters, and the like for affecting various types of adjustments to bandwidth associated with communication sessions.

According to various embodiments of the invention, feedback listening port 230 is a generic, or "well-known" port, that is configured to listen for feedback messages that include an identification of the feedback listening port 230 in their headers. A "well-known" port is a port that is established for a particular purpose, and is generally usable by any device that attempts to communicate with the sender 210. That is, in embodiments, feedback listening port 230 is configured to listen for and receive feedback messages from a number of receivers 212 and 214. In some embodiments, any receiver that sends a feedback message to sender 210 sends the message to feedback listening port 230. In other embodiments, groups or classes of receivers 212, 214 send feedback messages to assigned feedback listening ports 230. For example, in an embodiment, sender 210 might provide several services such as "real-time" multiplayer games, streaming video, and voice over IP (VoIP) to receivers 212 and 214. Sender 210 can have a feedback listening port 230 for each service, one feedback listening port 230 for all of the services, or any other combination or configuration suitable for facilitating receipt of feedback messages from receivers 212 and 214. In other embodiments, for example where sender 210 is a UDP streamer, feedback listening port 230 can be an assigned port number that is used by any sender 210 that is configured to receive feedback messages from receivers 212 and 214.

With continued reference to FIG. 2, receiver 212 includes media in port 232 and feedback port 234 and, similarly, receiver 214 includes media in port 236 and feedback port 238. Receivers 212 and 214 receive data packets transmitted from sender 210 by way of media in ports 232 and 236, respectively. Media in ports 232 and 236 refer to logical port designations and are addressable by sender 210. In embodiments of the invention, receiver 212, 214 can include any number of media in ports 232, 236. In some embodiments, receiver 212, 214 can include ports associated with various types of protocols, applications, media types, and the like. Each receiver 212 and 214 have corresponding IP addresses, which may be static or dynamically assigned, and the combination of a receiver's IP address and a port number is referred to as a socket identification. Thus, as mentioned above, a communication session can be identified by a pair of socket identifiers—a source socket identifier (e.g., an IP address and media out port number associated with sender 210) and a destination socket identifier (e.g., an IP address and media in port number associated with receiver 212).

As FIG. 2 further illustrates, receivers 212 and 214 each include a feedback port 234 and 238, respectively. Receivers 212 and 214 can transmit feedback messages to sender 210 by way of feedback ports 234 and 238. In this manner, the feedback communications described herein can be borne "out-of-band" with respect to the streaming content. Thus, feedback systems and methods such as those described herein can be added to existing data packet streamers, servers, and the like without affecting the functionality of the data packet streaming technology. Additionally, feedback can be generated, transmitted, received, and processed without interruption in the content stream.

Figure 3:
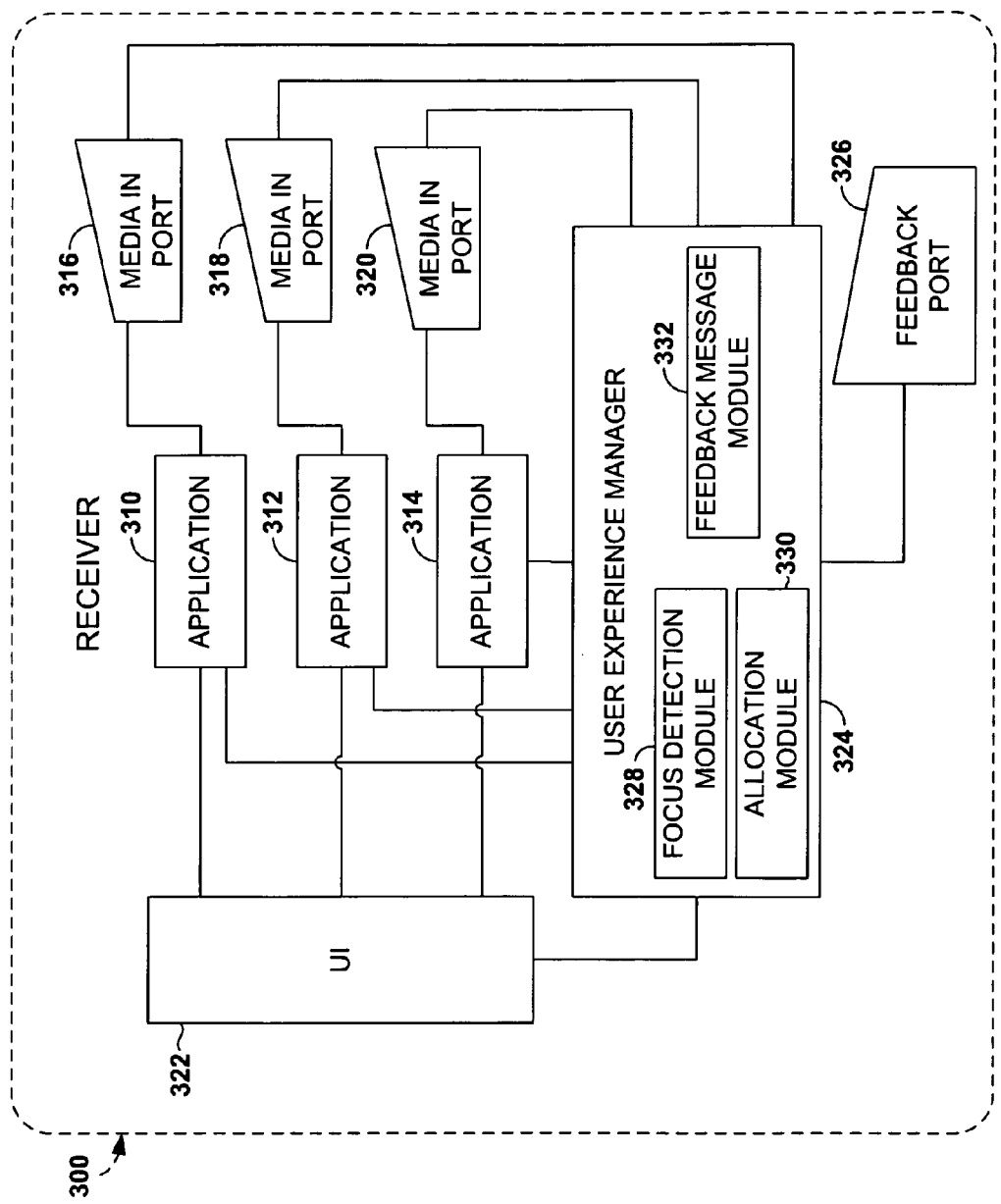
FIG. 3 is a block diagram showing an exemplary receiver in accordance with embodiments of the invention.

Turning now to FIG. 3, an exemplary receiver operating environment for implementing embodiments of the invention is illustrated. As shown in FIG. 3, receiver 300 includes applications 310, 312, and 314; media in ports 316, 318, and 320; a user interface (UI) 322; a user-experience manager 324; and a feedback port 326. As discussed above with reference to FIG. 2, receiver 300 can include any number of types of entities such as, for example, a client module on a computing device, a computing device, a wireless communications device, a client module on a wireless communications device, and the like. Receiver 300 is merely an example of one suitable receiver and is not intended to suggest any limitation as to the scope of use or functionality of embodiments of the invention. Neither should receiver 300 be interpreted as having any dependency or requirement related to any single component or combination of components illustrated therein.

According to various embodiments of the invention, applications 310, 312, and 314 can include applications, services, programs, program modules, scripts, application programming interfaces (APIs), drivers, hardware accelerators, and the like. In embodiments, applications 310, 312, and 314 process data packets received by way of media in ports 316, 318, and 320, respectively. Applications 310, 312, and 314 can work with UI 322 to present media to a user. Accordingly, applications 310, 312, and 314 can communicate with, or include, codecs, filters, digital rights management modules, descramblers, and the like. Compressed or encoded media can be received via media in ports 316, 318, and 320 and decompressed, decoded, processed, analyzed, rendered, displayed, stored, and the like by applications 310, 312, and 314 and UI 322. In various embodiments, an application 310, 312, or 314 can be configured to facilitate a service such as VoIP, online gaming, video streaming, instant messaging, and the like. Other modules and components not illustrated in FIG. 3 can also be included in receiver 300 for processing content.

As illustrated in FIG. 3, receiver 300 includes a user-experience manager 324 that organizes and manages the functionalities, services, and operations corresponding to applications 310, 312, and 314. User-experience manager 324 can be a software module, program, application, API, or the like and can include interfaces for providing a user with access to configuration options, service selections, and the like. In embodiments, user-experience manager 324 includes monitors for monitoring event stacks, communications, pings, and the like associated with media in ports 316, 318, and 320. In this manner, user-experience manager 324 can keep track of the type, quality, amount, and rate of incoming data packets from sender 210.

According to various embodiments of the invention, user-experience manager 324 includes modules and components that allow monitoring of applications 310, 312, and 314 and UI 322 so that user-experience manager 324 can determine which services the user is most likely using, or paying direct attention to, at any given time, thereby facilitating enhancement of the user's overall experience. For example, as illustrated in FIG. 3, user-experience manager 324 includes a focus detection module 328, an allocation module 330, and a feedback message module 332. User-experience manager 324 is merely an example of one suitable management module and is not intended to suggest any limitation as to the scope of use or functionality of embodiments of the invention. Neither should user-experience manager 324 be interpreted as having any dependency or requirement related to any single component or combination of components illustrated therein.

In embodiments of the invention, user-experience manager 324 keeps track of which applications 310, 312, 314 are active and which applications have focus. An application has focus when it is the application corresponding to the media, content, service, or function with which the user is currently interacting, viewing, experiencing, and the like. In one embodiment, user-experience manager 324 identifies active applications by using an API, method call, or other type of process to discover that an application 310, 312, 314 is currently running on receiver 300. In an embodiment, user-experience manager 324 determines that an application has focus by referencing applications 310, 312, and 314 by way of an API or other similar communication conduit. In another embodiment, user-experience manager 324 determines whether an application has focus by referencing UI 322.

According to various embodiments of the invention, user-experience manager 324 can communicate with UI 322 to determine which applications 310, 312, and 314 have focus and which do not. It should be understood that, in some embodiments, more than one application can have focus at a given time. In embodiments, an application has focus if the application corresponds to the immediate user experience. One way to identify which applications correspond to the immediate user experience is to reference the UI 322 to determine what is being presented on the display device associated with receiver 300.

Figure 5B:
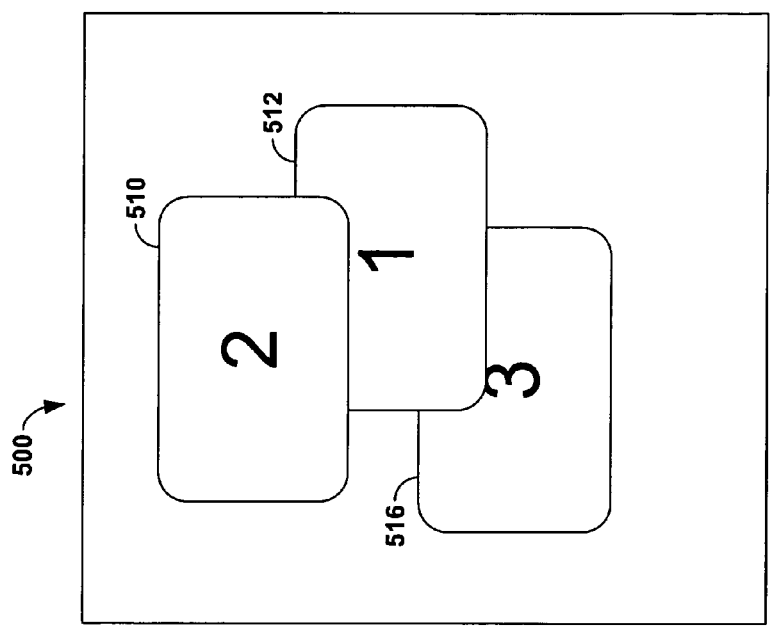
FIG. 5B is another screenshot depicting an illustrative user interface presenting overlapping application windows in accordance with embodiments of the invention.
Figure 5A:
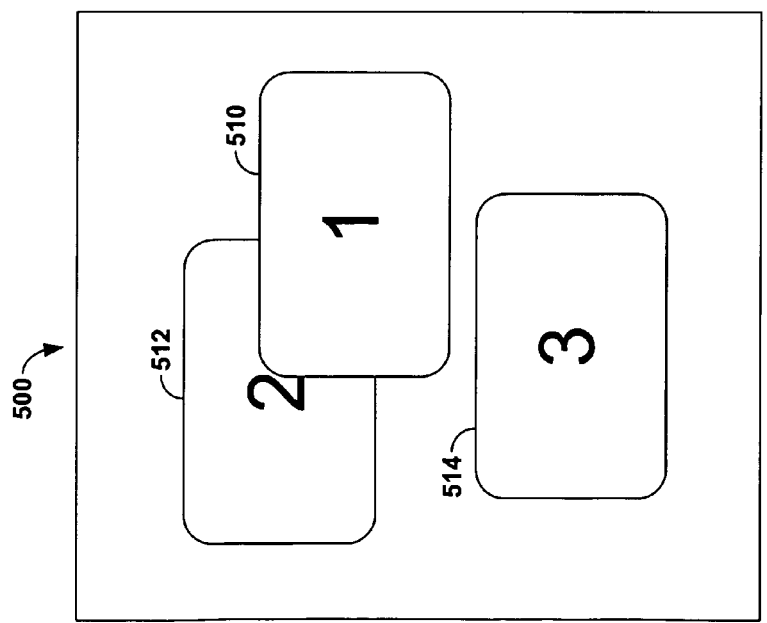
FIG. 5A is a screenshot depicting an illustrative user interface presenting overlapping application windows in accordance with embodiments of the invention.

In various embodiments, receiver 300 includes an operating system and/or other system software that enables a windowing environment to be presented to a user by way of UI 322. Turning briefly to FIGS. 5A and 5B, there is illustrated an exemplary display 500 that includes a number of application windows, labeled "1," "2," and "3." Display 500 is oriented in an X-Y plane of a 3-dimensional space. That is, the horizontal direction in FIG. 1 may be represented by an X-axis and the vertical direction may be represented by a Y-axis. Accordingly, a positive Z-axis would be directed orthogonally to the X- and Y-axes. It will be understood by those having knowledge in the art that application windows can be arranged on a display such that some windows overlap others. Generally, the window that is "on top" is the window corresponding to the application that has focus—this way a user can interact with the application having focus without the experience being obscured by other application windows. As used herein, the term "z-value" refers to the position of an application window along the Z-axis.

Thus, as illustrated in FIG. 5A, application window "1" has a highest z-value 510, and since application window "2" is "behind" application window "1," application window "2" has a lower z-value 512 than the z-value 510 of application window "1." In embodiments, application window "3" may have a z-value 514 that is equal to, higher than, or lower than the z-value 510 of application window "1." This may occur when a user is currently interacting with more than one application. Additionally, in various embodiments, z-values can be represented by scaled numerical values assigned based on a graphical representation of the display space. In other embodiments, z-values can be represented by ranks such that each z-value indicates the position of an application window along the Z-axis with respect to the positions of other application windows on a display. Thus, for example, in FIG. 5A, application window "1" might have a z-value of 1, whereas application window "2" might have a z-value of 2. In other embodiments, other identification schemes can be used for assigning and operating on z-values corresponding to application windows rendered on a display associated with receivers.

As illustrated in FIG. 5A, application window "1" corresponds to an application that has focus. Additionally, in some embodiments, application window "3" may also correspond to an application that has focus. In response to an input from a user, an instruction from a program, or other device or entity, focus can be changed from one application window to another. Thus, as illustrated in FIG. 5B, application window "1" no longer has focus. Focus has been shifted to application window "2." Additionally, application window "3" is more clearly not in focus in FIG. 5B as it appears to be partially obscured by application windows "1" and "2." This change in focus can be affected in response to, for example, a user clicking on application window "2." As users multitask and switch between different application windows, the corresponding demands upon the applications shift, often many times within a short period of time. Thus, in FIG. 5B, application window "2" has the highest z-value 510, application window "1" has the next highest z-value 512, and application window "3" has the lowest z-value 516. By determining z-values associated with application windows, and thus applications, the user-experience manager 324, illustrated in FIG. 3, can determine which application is in focus at any given time, and can thereby allocate bandwidth capabilities appropriately so that more bandwidth is dedicated to applications having focus, thereby enhancing the user's overall experience. Embodiments of the invention allow for dynamic assessment of bandwidth usage and requirement amounts, and dynamic provisioning of bandwidth to applications based on focus (e.g., based on what the user is experiencing).

Returning to FIG. 3, as illustrated, user-experience manager 324 includes focus detection module 328, which can identify active applications, and can determine which of the active applications have focus at a given instant of time. In embodiments, focus detection module 328 provides information regarding which applications are active and which applications have focus to allocation module 330. According to embodiments of the invention, allocation module 330 determines current bandwidth usage amounts associated with applications 310, 312, and 314. In embodiments, allocation module 330 references applications 310, 312, and 314 using an API or other conduit to determine bandwidth requirement amounts associated with the applications 310, 312, and 314. In embodiments, bandwidth requirement amounts can include packet transmission rates, bandwidth measurements, and the like that are necessary for a minimal level of functionality. In other embodiments, bandwidth requirement amounts can refer to optimum bandwidths for high-quality experiences. In further embodiments, bandwidth requirement amounts can refer to ranges within which bandwidths provide for acceptable, good, or exceptional functionality. Other particularities and nuances can be included within bandwidth requirement amounts, depending on the associated services and technology, and all are considered to be within the ambit of this disclosure.

Allocation module 330 also can determine bandwidth usage amounts corresponding to communication sessions and/or associated applications 310, 312, and 314. In embodiments, allocation module 330 can reference applications 310, 312, and 314 to determine bandwidth usage amounts. In other embodiments, allocation module 330 can reference monitors of media in ports 316, 318, and 320 to obtain bandwidth usage amounts. In embodiments, bandwidth usage amounts can include measurements of packet receipt rates, packet size, and the like, and can include discrete measurements or ranges of measurements. By comparing bandwidth usage amounts and bandwidth requirement amounts associated with active applications having focus to similar attributes associated with active applications that do not have focus, allocation module 330 can determine optimum bandwidth adjustment amounts for enhancement of the user's experience. That is, if application 310 is active and has focus and requires a large amount of bandwidth for quality functionality, allocation module 330 might determine that the corresponding bandwidth should be increased, while bandwidths associated with applications that do not have focus, or that have lower requirements such as, for example, applications 312 and 314 may be reduced. In this manner, a receiving device 300 can better take advantage of the bandwidth capabilities inherent to the device, the networks, the content providers, and the like by provisioning bandwidth between communication sessions based on the user's experience.

As further illustrated in FIG. 3, user-experience manager 324 includes feedback message module 332. Feedback message module 332 generates feedback messages that can be provided to a sender to request adjustments to bandwidth based on decisions made in the allocation module 330. Thus, for example, focus detection module 328 might determine that an application 312 that previously did not have focus has just been given focus. Accordingly, allocation module 330 can determine a bandwidth increase appropriate for application 312 and, potentially, bandwidth decrease amounts appropriate for applications 310 and 314. The bandwidth adjustment amounts and an identification of the corresponding communication sessions are communicated to feedback message module 332, which generates a feedback message corresponding to each session to be transmitted via feedback port 326 to the associated sender.

Turning briefly to FIG. 4A, a schematic block diagram is shown, which depicts an illustrative implementation of an embodiment of the invention. A sender 410 transmits a plurality of data packets 422 to a receiver 412. Although not illustrated in FIG. 4A, a network or a number of networks can be disposed between sender 410 and receiver 412 and any number of other components, entities, devices, or the like can be included according to various embodiments of the invention. The illustrative implementation depicted in FIG. 4A is merely an example of one suitable implementation of the invention and is not intended to suggest any limitation as to the scope of use or functionality of embodiments of the invention. Neither should the illustrative implementation depicted in FIG. 4A be interpreted as having any dependency or requirement related to any single component or combination of components illustrated therein.

As illustrated in FIG. 4A, the communication session characterized by the sending of data packets 422 to receiver 412 can be identified by socket identifications. Sender 410 includes a first socket 414, SOCKET-1, which identifies an IP address and port number associated with sender 410 and corresponding to the transmission of data packets 422 to receiver 412. Similarly, receiver 412 includes a second socket 418, SOCKET-2, which identifies an IP address and port number associated with receiver 412 and corresponding to the receipt of data packets 422 from sender 410. Thus, the data session can be identified by the first and second sockets 414, 418 (i.e., SOCKET-1 and SOCKET-2).

Receiver 412 can include software modules, clients, or the like that monitor the communication session identified by SOCKET-1 and SOCKET-2. If there is some decrease in quality associated with the stream of data packets 422 or if there is a change in the application that has focus on receiver 412, as discussed above with reference to FIG. 3, receiver 412 can generate a feedback message 424 and communicate the feedback message 424 to sender 410. In various embodiments of the invention, the feedback message 424 can include an instruction or request to adjust the bandwidth, rate of packet transmission, packet size, packet format, and the like. The feedback message 424 includes an identification of the communication session to which the feedback corresponds, so that sender 410 can apply the requested adjustment to the correct data packet stream.

As depicted in FIG. 4A, sender 410 includes a third socket 416, SOCKET-3. SOCKET-3 416 can correspond to a generic, or "well-known," port number that is established for the purpose of receiving feedback messages from receivers such as receiver 412. Similarly, receiver 412 can include a fourth socket 420, SOCKET-4, through which receiver 412 transmits feedback messages 424 to sender 410. In various embodiments, feedback message 424 can also include identifications associated with the third and fourth sockets 416, 420. For example, as illustrated in FIG. 4B, an exemplary feedback message 424 is depicted in accordance with embodiments of the invention.

As shown in FIG. 4B, feedback message 424 may include an IP header 426, a UDP header 428, and a payload 430. In various embodiments, IP header 426 can be configured according to any number of versions of IP such as, for example, IP version 4 (IPv4) and IP version 6 (IPv6). Similarly, UDP header 428 can, in other embodiments, be a header associated with some connectionless protocol other than UDP. In various embodiments, feedback message 424 can also include extensions, tails, modifications, and the like. Additional headers can also be included in various embodiments of the invention. Feedback message 424 is an example of one suitable feedback message format and is not intended to suggest any limitation as to the scope of use or functionality of embodiments of the invention. Neither should feedback message 424 be interpreted as having any dependency or requirement related to any single component or combination of components illustrated therein.

As illustrated in FIG. 4B, IP header 426 includes a source IP address 432 and a destination IP address 434. For example, according to embodiments of the invention, the feedback message 424 depicted in FIG. 4A includes a source IP address 432 associated with receiver 412, because receiver 412 is the source of feedback message 424. IP header 426 also includes an IP address 434 associated with sender 410 because sender 410 is the destination of feedback message 424. Similarly, the UDP header 428 includes a source port number 436, which is associated with the fourth socket 420, SOCKET-4. UDP header 428 also includes a destination port number 438, which is associated with the third socket 416, SOCKET-3. It should be evident then, that in some embodiments, feedback message 424 includes socket identifications corresponding to SOCKET-3 and SOCKET-4 in header fields. This information may also be referred to as addressing information because it includes the addresses necessary for routing the feedback message 424.

As further illustrated in FIG. 4B, feedback message 424 includes a payload 430. Payload 430 includes an application header 440, which identifies an application associated with receiver 412 that is involved in or corresponds to the communication session identified, for example, by a pair of socket identifications 414, 418. In embodiments, application header 440 can include a code, a name, or some other indication related to the corresponding application. Payload 430 also includes a session identifier 442. Session identifier 442 can be used by a sender, such as sender 410 illustrated in FIG. 4A, to identify the session to which the feedback message corresponds. As illustrated, session identifier 442 includes a first socket identification 446 and a second socket identification 448 (e.g., SOCKET-1 and SOCKET-2). Together, the two socket identifiers 446 and 448 identify the corresponding communication session, which, as illustrated in FIG. 4A, comprises the transmission of data packets 422 from sender 410 to receiver 412 via SOCKET-1 and SOCKET-2. In various embodiments of the invention, other codes, numbers, addressing information, or the like can be included in payload 430 for identifying communications sessions and other facts.

Payload 430 further includes an instruction 444 (e.g., request) for an adjustment of bandwidth corresponding to the session identified by session identifier 442. The instruction can be generated in any number of types of code, pseudocode, Unicode, and the like and include any number of instructions related to adjustment of bandwidth. In one example, instruction 444 can include data that is assigned to a variable associated with the corresponding communication session, thereby adjusting an attribute thereof relating to packet transmission rate, bandwidth, packet size, choice of codec, or the like. Additional information, instructions, and/or requests can be included in extensions, headers, tails, and the like.

Figure 6:
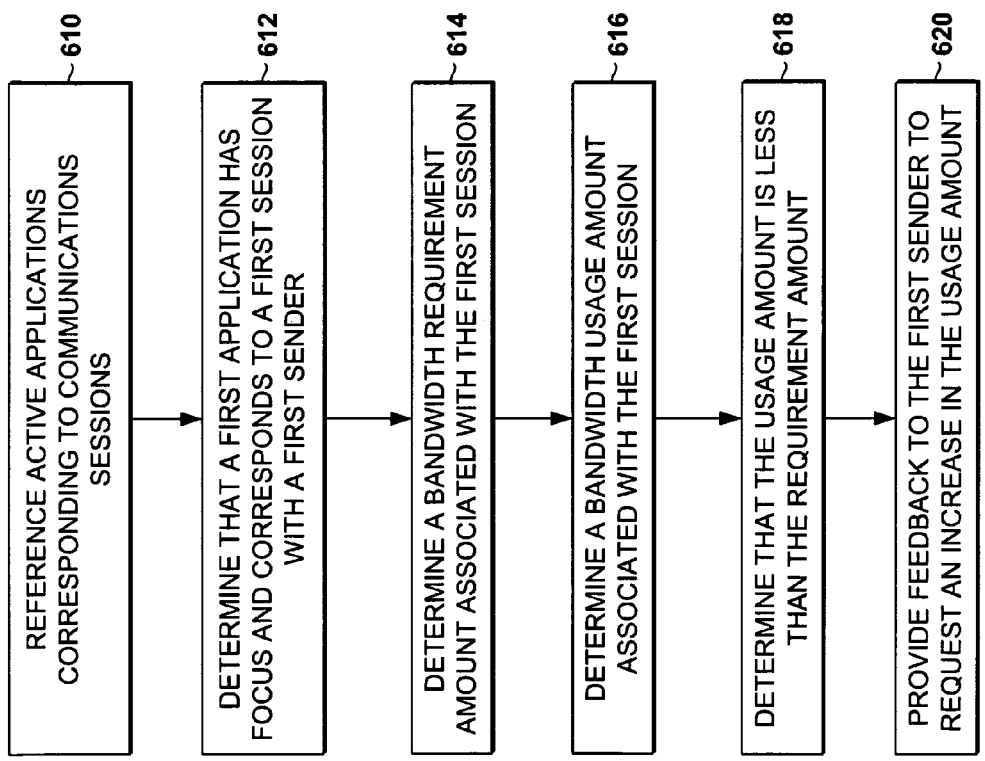
FIG. 6 is a flow diagram showing an illustrative method of managing bandwidth corresponding to one or more communication sessions associated with a receiver on a computing device in accordance with embodiments of the invention.

To recapitulate, we have described systems for using feedback messages to manage bandwidth associated with packet streaming sessions. Turning to FIG. 6, a flow diagram is provided, showing an illustrative method of managing bandwidth corresponding to one or more communication sessions associated with a receiver on a computing device. At a first illustrative step, step 610, a user-experience manager in a receiver references a plurality of active applications. Each application can correspond to one or more communication sessions. Data sessions, as explained above, can be characterized by the transmission of data packets from a sender to the receiver.

As further illustrated in FIG. 6, the user-experience manager determines whether each of the active applications has focus. More particularly, in one embodiment, as shown at step 612, the user-experience manager determines that a first application has focus. The first application can correspond to a first communication session with a first sender. As shown at step 614, the user-experience manager determines a bandwidth requirement amount associated with the first session. In various embodiments, the bandwidth requirement amount can include rates of packet transmission, packet size, and the like corresponding to a minimal user experience. In other embodiments, bandwidth requirement amounts can correspond to higher-quality user experiences.

As illustrated at step 616, the user-experience manager determines a bandwidth usage amount associated with the first session and compares the amount with the bandwidth requirement amount. If, as shown at step 618, it is determined that the bandwidth usage amount is less than the bandwidth requirement amount, the user-experience manager can reference other active applications to determine corresponding bandwidth usage and requirement amounts and to determine whether the applications have focus. Based on all of the collected data, the user-experience manager can make optimizing decisions for allocating bandwidth capabilities associated with the receiver between the various communication sessions associated with the applications. To realize the goals of the decisions made, the user-experience manager can generate a feedback message for providing feedback, requests, and instructions for bandwidth adjustments to the sender. At a final illustrative step 620, the receiver can provide the feedback to the first sender to request an increase in the bandwidth of the first communication session (and possibly decreases in bandwidths associated with other sessions).

Turning now to FIG. 7, a flow diagram showing an illustrative method of dynamically managing a plurality of communication sessions associated with a receiver is illustrated. At a first illustrative step 710, a user-experience manager associated with a receiver identifies a plurality of active applications. Each active application can be associated with a communication session. For example, in an embodiment, a first application can be associated with a first communication session with a first sender, and a second application can be associated with a second communication session with a second sender. As shown at step 712, the user-experience manager determines that a first one of the plurality of active applications has focus. Additionally, the user-experience manager determines that a second application does not have focus, as shown at step 714.

With reference to step 716 of FIG. 7, the user-experience manager determines a first bandwidth usage amount corresponding to the first session and, at step 718, the user-experience manager determines a second bandwidth usage amount corresponding to the second communication session. A bandwidth requirement amount corresponding to the first session is determined at step 720. In various embodiments, bandwidth requirement amounts corresponding to any and/or all of the other communication sessions can also be determined. As shown at step 722, the user-experience manager determines that the bandwidth requirement amount for the first session is greater than the bandwidth usage amount associated with the first session. Then, based on information about the various applications and communication sessions, the user-experience manager computes an appropriate bandwidth adjustment amount (e.g., an increase) corresponding to the first session, as shown at step 724. In a final illustrative step 726, the receiver communicates a feedback message to the first sender. The feedback message can include an identification of the first communication session and an instruction. For example, in an embodiment, the feedback message includes a request to adjust the first bandwidth according to the appropriate bandwidth adjustment amount computed by the user-experience manager.

Many different arrangements of the various components depicted, as well as components not shown, are possible without departing from the spirit and scope of the invention. For example, in some embodiments, user-experience managers may be configured to wait for a predetermined amount of time before communicating a feedback message in response to a focus status change in relation to an application. In this way, feedback messages will be less likely to be communicated based on accidental or very temporary shifts in focus. Furthermore, embodiments of the invention have been described with the intent to be illustrative rather than restrictive. It will be understood that certain features and subcombinations are of utility and may be employed without reference to other features and subcombinations and are contemplated within the scope of the claims. Not all steps listed in the various figures need be carried out in the specific order described, unless otherwise specified.

The invention claimed is:

1. One or more non-transitory computer-readable media having computer-executable instructions embodied thereon for performing a method of managing bandwidth corresponding to one or more communication sessions associated with a receiver on a computing device, the method comprising:
referencing a plurality of active applications, wherein each of the plurality of active applications corresponds to a communication session that comprises a plurality of data packets received from a sender;
determining that a first application has focus, wherein the first application corresponds to a first communication session with a first sender;
determining a bandwidth requirement amount associated with the first communication session;
determining a first bandwidth usage amount associated with the first communication session;
determining that said first bandwidth usage amount is less than said bandwidth requirement amount;
in response to the first application having focus, providing feedback to the first sender, wherein the feedback comprises a request to increase said first bandwidth usage amount; and
wherein determining that a first application has focus comprises identifying each of the plurality of active applications, wherein each of the plurality of active applications is associated with a user interface having a corresponding z-value.

2. The media of claim 1, wherein determining that a first application has focus further comprises determining that the first application is associated with a first user interface, the first user interface having a corresponding z-value that is greater than a second z-value corresponding to a second user interface.

3. The media of claim 1, wherein determining that a first application has focus further comprises determining that the first application is associated with a first user interface, the first user interface having a corresponding maximum z-value.

4. The media of claim 1, wherein providing feedback to the first sender comprises communicating a first feedback message to the first sender via a port associated with the first sender.

5. The media of claim 1, further comprising determining that a second application does not have focus, wherein the second application corresponds to a second communication session with a second sender.

6. The media of claim 5, further comprising:
determining a second bandwidth usage amount associated with the second communication session; and
providing feedback to the second sender, wherein the feedback comprises a request to decrease said second bandwidth usage amount.

7. The media of claim 6, wherein each of said first and second communication sessions comprises a user datagram protocol (UDP) session.

8. The media of claim 7, wherein said first feedback comprises an identification of the first UDP session, the identification comprising a tuple.

9. The media of claim 1, wherein the computing device comprises a wireless device.

10. A system for use in a data packet sender, wherein the system facilitates managing a bandwidth associated with sending data packets to a receiver during a communication session, the system comprising:
a media out port through which the sender transmits a plurality of data packets to the receiver during a first communication session according to a first bandwidth;
a feedback listening port through which the sender receives a feedback message from the receiver, the feedback message comprising an identification of the first communication session, wherein the feedback message further comprises a request to change the first bandwidth to a second bandwidth in response to a first application on the receiver obtaining focus;
a bandwidth manager that receives the request and adjusts a data packet transmission rate corresponding to the first communication session, wherein the bandwidth manager adjusts the data packet transmission rate such that the sender transmits a plurality of data packets to the receiver according to the second bandwidth; and
wherein determining that a first application has focus comprises identifying each of the plurality of active applications, wherein each of the plurality of active applications is associated with a user interface having a corresponding z-value.

11. The system of claim 10, wherein the feedback listening port receives feedback messages from a plurality of receivers.

12. The system of claim 10, further comprising a session manager that parses a first feedback message to extract a session identifier comprising an identification of the first communication session.

13. The system of claim 12, wherein the identification of the first communication session comprises address information associated with the receiver.

14. The system of claim 13, wherein the first communication session comprises a user datagram protocol (UDP) session.

15. The system of claim 10, wherein said receiver comprises a wireless device.

16. One or more non-transitory computer-readable media having computer-executable instructions embodied thereon for performing a method of dynamically managing a plurality of communication sessions associated with a receiver, the method comprising:
identifying a plurality of active applications, wherein each of the active applications is associated with a communication session;
determining that a first one of the plurality of active applications has focus, wherein the first application is associated with a first communication session that comprises receiving data packets from a first sender;
determining that a second one of the plurality of active applications does not have focus, wherein the second application is associated with a second communication session that comprises receiving data packets from a second sender;
determining a first bandwidth usage amount corresponding to the first communication session;
determining a second bandwidth usage amount corresponding to the second communication session;
determining a bandwidth requirement amount corresponding to the first communication session;
determining that the bandwidth requirement amount is greater than the first bandwidth usage amount;
computing an appropriate bandwidth increase amount corresponding to the first communication session; and
in response to the first one of the plurality of active applications having focus, communicating a first feedback message to the first sender, the first feedback message comprising a request to adjust the first bandwidth according to the appropriate bandwidth increase amount; and
wherein determining that a first application has focus comprises identifying each of the plurality of active applications, wherein each of the plurality of active applications is associated with a user interface having a corresponding z-value.

17. The media of claim 16, further comprising computing a first appropriate bandwidth decrease amount which is less than the second bandwidth usage amount corresponding to the second communication session.

18. The media of claim 17, further comprising communicating a second feedback message to the second sender, the second feedback message comprising a request to adjust the second bandwidth according to the first appropriate bandwidth decrease amount.

19. The media of claim 18, further comprising:
determining that a third one of the plurality of applications does not have focus, wherein the third application is associated with a third communication session that comprises receiving data packets from a third sender;
determining a third bandwidth usage amount corresponding to the third communication session;
computing a second appropriate bandwidth decrease amount corresponding to the third communication session, wherein the second appropriate bandwidth decrease amount is based on the first appropriate bandwidth decrease amount and the appropriate bandwidth increase amount; and
communicating a third feedback message to the third sender, the third feedback message comprising a request to adjust the third bandwidth according to the second appropriate bandwidth decrease amount.

* * * * *